United States Patent [19]

Sutton

[11] Patent Number: 4,458,320

[45] Date of Patent: Jul. 3, 1984

[54] ELECTRONIC CALCULATING DEVICE

[76] Inventor: Gordon R. Sutton, 7425 Sepulveda #30, Van Nuys, Calif. 91405

[21] Appl. No.: 280,868

[22] Filed: Jul. 6, 1981

[51] Int. Cl.³ .............................................. G06F 15/20
[52] U.S. Cl. .................................... 364/464; 364/709; 235/379
[58] Field of Search ............... 364/708, 709, 710, 464; 235/379, 378

[56] References Cited

U.S. PATENT DOCUMENTS

| | | | |
|---|---|---|---|
| 3,526,887 | 9/1970 | Erni | 340/324 |
| 4,041,291 | 8/1977 | Pavda | 235/156 |
| 4,071,891 | 1/1978 | Barrows | 364/715 X |
| 4,115,870 | 9/1978 | Lowell | 364/900 |
| 4,120,040 | 10/1978 | Aihara | 364/709 |
| 4,180,206 | 12/1979 | Shigeo et al. | 235/419 |
| 4,192,006 | 3/1980 | Hausdorff | 364/464 X |
| 4,224,675 | 9/1980 | Pinkerman | 364/705 |
| 4,277,837 | 7/1981 | Stuckert | 235/379 X |
| 4,334,278 | 6/1982 | Marmon | 364/464 X |
| 4,346,450 | 8/1982 | Matsuyama | 364/710 |

Primary Examiner—Edward J. Wise
Attorney, Agent, or Firm—Fulwider, Patton, Rieber, Lee & Utecht

[57] ABSTRACT

An electronic calculating device having a keyboard with input keys for the digits 0-9, an item register and display for storing and displaying, in a fixed-point format of dollars and cents, an item-price number entered via the input keys, a separate total register and display for storing and displaying a total number in similar format, and delay logic circuitry for automatically transferring the item-price number to an accumulator for summing with the total number only after a predetermined delay period following entry of the item-price number, the new total number then being entered into the total register and display. Means are provided, through selective operation of function keys prior to the end of the delay period, for applying a programmed tax rate to the item-price number, for correcting the item-price number by inhibiting the delay logic circuitry and clearing the item register, and for subtracting an amount, including tax, from the total number.

21 Claims, 6 Drawing Figures

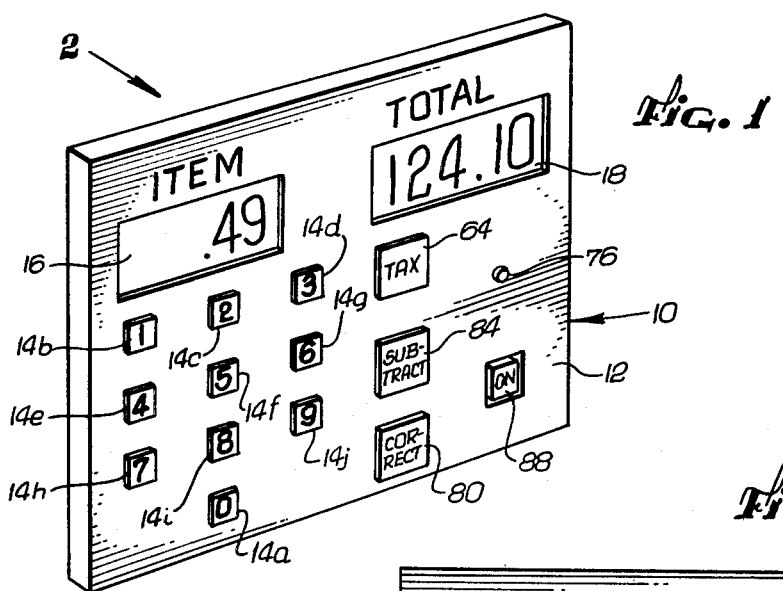
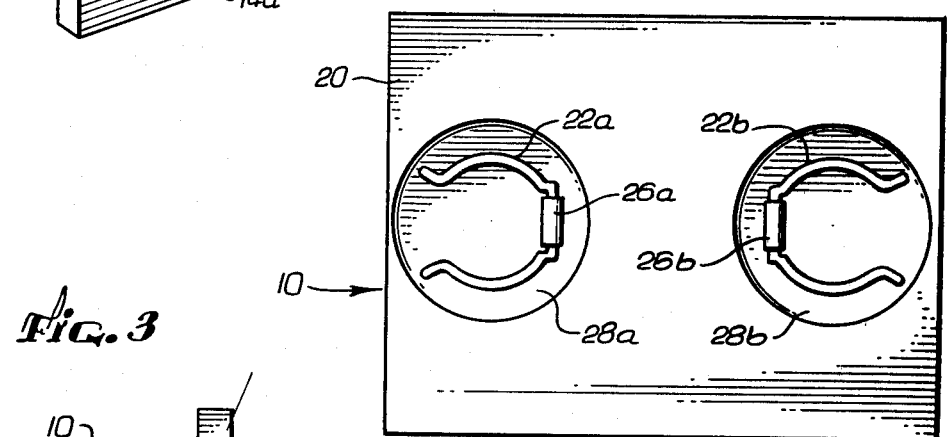
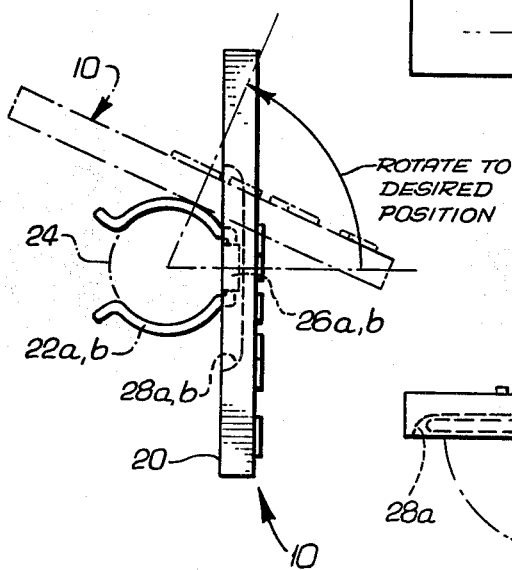
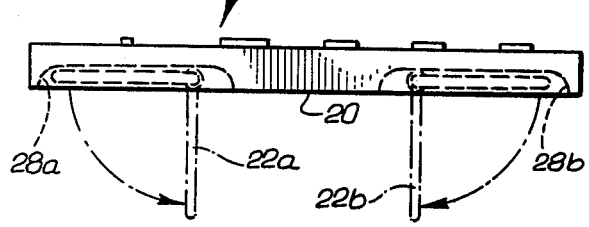

ELECTRONIC CALCULATING DEVICE

BACKGROUND OF THE INVENTION

The present invention relates generally to hand-holdable electronic calculating devices.

Battery-powered, hand-holdable electronic calculating devices (or "calculators") are well-known for rapidly performing calculations ranging from relatively easy arithmetical operations to complex mathematical computations. The simplest in design of these calculators features a display, a keyboard with individual input keys for the digits 0–9, functional keys for the arithemetic operations of addition, subtraction, multiplication and division, an "equal" key, and of course the appropriate electronic circuitry to functionally implement each of these features. Additional features of still relatively simple calculators include an input key for a decimal point, keys for clearing the results of previous calculations stored in the device or for clearing only the last number entry, an auxiliary memory for storing and recalling intermediate calculations, a constant function allowing entry and storage of a fixed number to be used over and over again in addition, subtraction, multiplication or division, and a percent key by which an entry can be used more readily to take a percentage of a number. Beyond this, a wide variety of relatively complex and expensive scientific, business and programmable calculators are available.

Despite the low cost and ready availability of the aforedescribed simple calculators, many, if not most, persons heretofore have not taken advantage of them to the fullest possible extent. In particular, it has been noted that shoppers typically have not used electronic calculators to keep track of their purchases while selecting large numbers of items during grocery shopping. This is despite limited budgets of shoppers, recent high rates of inflation, the risk of errors by checkers in checking-out shoppers' selections and the difficulty of catching those errors, and concerns for the accuracy and reliability of semi-automatic check-out by means of scanners that optically read specially encoded portions of the labels on items to determine the price to be charged to the shopper.

A major reason that most shoppers do not take advantage of electronic calculators is believed to be that they consider even the simplest calculators to be overly-complex and inconvenient to use. For example, a common characteristic of all electronic calculators is that a "plus" key or an "equal" key must be pressed after each number entry is made in order to add the numbers. The proper sequence for pressing these keys can differ among various calculators. An inexperienced operator can very easily become confused, pressing one of these keys more than once, and possibly produce an erroneous total. Those familiar with the design of calculators will recognize other errors novice or occasional operators are prone to make.

Thus, despite the relative simplicity of the most basic electronic calculators, there is a need for improvement in the foregoing and in other respects. The present invention is directed to these ends.

SUMMARY OF THE INVENTION

Briefly, and in general terms, the present invention resides in a hand-holdable electronic calculating device in which each entry of a price of an item selected by a shopper is displayed individually, and then is automatically summed and displayed as total after a delay period of predetermined duration, without the necessity of manually operating any function keys. Because the device of the present invention, in its normal mode of operation, does the addition of prices of items automatically, there is no need for operating any functional keys in a particular sequence, and resulting errors are thereby eliminated.

More specifically, in a presently preferred embodiment, the price of each individual item is input to the device through operation of a conventional keyboard having input keys for the digits 0 through 9, this "item-price number" being stored in an "item" register and displayed in a fixed-point format of dollars and cents. A second, "total" register is provided for storing a number representing, in general, the total of all item prices previously input, this "total number" also being displayed in the fixed-point format of dollars and cents. Operating the input keys activates delay logic circuitry that controls the automatic transfer of the item-price number from the item register to an accumulator, wherein the item-price number is summed with the total number, the transfer coming a relatively short time following input. The resulting "new" total number then replaces the pre-existing total number in the total register. The delay logic circuitry can be such that each successive input of a digit within the delay period can operate to restart it, or alternatively, the delay period can be made to run uninterrupted once the first digit of an item-price number is input.

Preferably, the device has separate displays, an "item" display and a "total" display, so that the operator can visually observe and confirm the item-price number as it is being entered, and also continuously observe the total number.

During the running of the aforedescribed delay period, menas are provided, via the operation of a tax key, for a calculation in which the item-price is increased by an applicable amount of tax prior to being summed in the accumulator. Importantly, the appropriate tax rate is programmable and thus can be adjusted to reflect differing percentages among localities or changes in the rate within a locale.

In a further aspect of the invention, the device includes means for correcting item price entries prior to transfer to the accumulator, whereby operation of a correction key within the delay period serves to inhibit the delay logic circuitry and clear the item-price number from the item register. Also, means are provided for subtracting amounts from the total, as required for example when an item is returned to the shelves, by operating a subtraction key prior to the running of the delay period initiated by entering the price of the item through the input keys. In such a case, it is possible to include an appropriate amount of tax in the subtraction by also operating the tax key before the end of the delay period.

It will be appreciated that an electronic calculating device of the foregoing character represents a significant improvement in design, allowing for simplified and virtually foolproof operation. Other aspects and advantages of the invention will become apparent from the following more detailed description taken in conjunction with the accompanying drawings.

BRIEF DESCRIPTION OF THE DRAWINGS

FIG. 1 is a perspective view of an electronic calculating device in accordance with the present invention, an item-price number appearing in the item display during the delay period, prior to transfer to the accumulator, and a total number appearing in the total display;

FIG. 2 is an enlarged rear view of the electronic calculating device of FIG. 1, showing a pair of foldable clips designed for attachment to the push-bar of a shopping cart;

FIG. 3 is an end view of the electronic calculating device shown with its clips unfolded and attached to a shopping cart push-bar, the manner in which the device can be rotated to a desired angular position on the push-bar being represented in phantom;

FIG. 4 is a top view of the electronic calculating device illustrating the operation of the clips;

DETAILED DESCRIPTION OF THE PREFERRED EMBODIMENT

Figure 5:
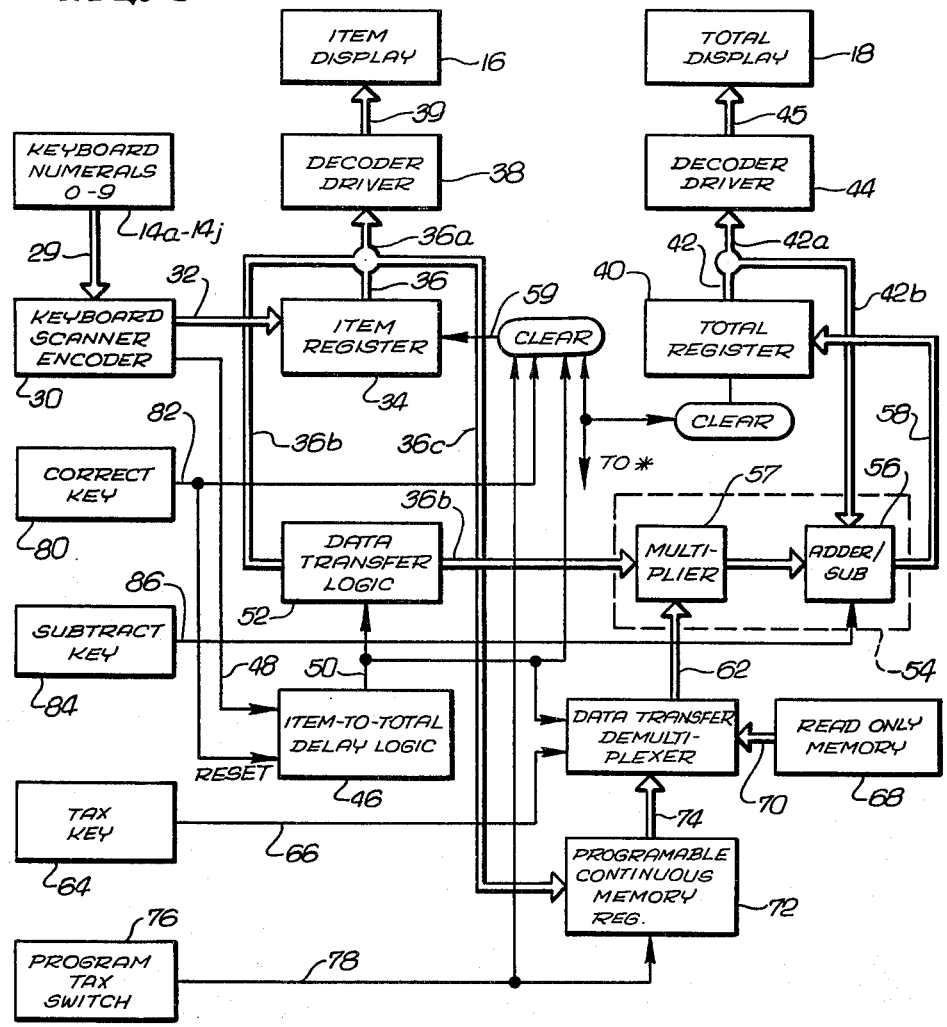
FIG. 5 is a preferred embodiment of a block diagram of the electronic calculating device of the present invention.

Referring now to the drawings for purposes of illustrating a presently preferred embodiment of the invention, and more particularly to FIG. 1 thereof, the electronic calculating device is contained in a housing, indicated generally by reference numeral 10, having a face 12 that includes a keyboard consisting of input keys 14a through 14j for the digits 0 through 9, respectively, by means of which the operator can enter prices of individual items, and further having an "item" display 16 for visually displaying the resulting item-price number so entered. One such entry is shown in FIG. 1 as an item price of 0.49. The face 12 of the housing 10 also includes a separate "total" display 18, which in general provides a continuous visual display of the cumulative result of all previous entries in, and operations of, the device by the operator during a shopping trip, in this case resulting in the amount of $124.10. The face 12 further includes various functional keys and the like the purpose of which will be explained in detail below.

Briefly viewing FIGS. 2–4, the rear side 20 of the housing 10 has a pair of resilient clips 22a, 22b specially adapted to be received over a push-bar 24 of a typical shopping cart (not shown) to hold the device in a convenient position for use while shopping. Each clip 22a, 22b is pivotably mounted, as at 26a, 26b, within a recess 28a, 28b in the rear side 20 of the housing 10 to allow the clips to be unobtrusively folded away when the device is not in use (FIG. 4). Although the clips 22a, 22b are sized and have sufficient spring to hold the device in place, they allow it to be rotated to any desired angular position to suit the convenience of the operator, as best shown in FIG. 3.

Figure 6:
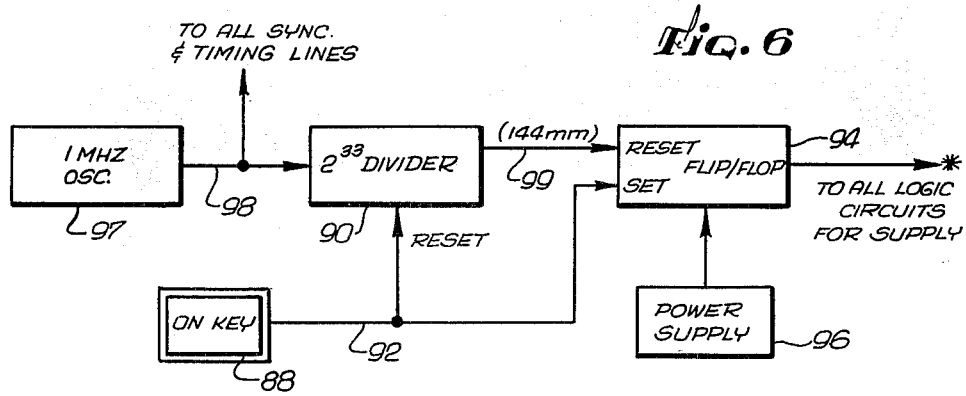
FIG. 6 is a block diagram of the power and timing signal subsystem of the electronic calculating device.

A block diagram of a suitable system utilizing conventional and readily available componentry, for implementing the device of the present invention, is shown in FIGS. 5 and 6. In this system, there is a keyboard scanner/encoder 30 that continually scans the input keys 14a–14j (represented as a unit in FIG. 5) over data line 29 for the presence of an input. When one of these input keys 14a–14j is operated, the keyboard scanner/encoder 30 encodes the value of the key into a binary-coded-decminal (BCD) equivalent and shifts this over data line 32 to an item register 34, where the BCD-encoded value is stored. The output of the item register 34 on data line 36 is in turn provided over a branch data line 36a to a decoder-driver 38, where it is converted from BCD into a seven segment value and then provided over data line 39 for immediate display on the item display 16. The digit so displayed corresponds to the input key operated, and appears in the right-most position of the display. If and when a second input key 14a–14j is operated, it also is encoded into BCD, stored in the item register 34, and converted into a seven segment value for display in the right-most position of the display 16, thereby shifting the first digit displayed to the left. This process may continue until the item register 34 and item display 16 are full, at which point the item register will accept no more entries. The digits so entered are displayed in a fixed-point format, in which there are two digits to the right of the decimal point, so that the entry appears in dollars and cents on the display.

The device illustrated in the drawings also includes a total register 40 for storing a "total" number, which is the aforementioned cumulative result of previous entries and operations continuously shown on the total display 18. The output of the total register 40 on data line 42 also is connected via a branch data line 42a to an associated decoder-driver 44, which itself is connected via a data line 45 to the total display 18, for providing a visual display in the same manner described above for the item register 34 and its associated decoder-driver 38 and item display 16.

In accordance with the invention, summation of the item-price number stored in the item register 34 with previously entered item-price numbers stored in the total register 40 occurs not as the result of operating a functional "plus" or "equal" key, but takes place automatically a predetermined time period after the item-price number has been entered. In this regard, item-to-total delay logic 46 monitors the keyboard scanner/encoder 30 over line 48 to detect operation of the input keys 14a–14j, and controls, via line 50, the transfer of the BCD-encoded item price number by data transfer logic 52 from the output of the item register 34, along branch data line 36b, to an arithmetic logic unit (ALU) 54. The ALU 54 includes a multiplier 57 for tax computations (discussed below) and an adder/subtracter 56, which is normally set in its additive mode of operation.

In the presently preferred enbodiment shown in FIG. 5, the delay logic 46 provides a two second delay following entry of the item-price number before transfer to the ALU 54. Each time an input key 14a–14j is operated, the delay logic 46 is reset and enabled, i.e., restarted, so that up to two seconds is permitted between entry of individual digits of an item-price number before automatic transfer occurs. Alternatively, the delay logic 46 can be selected such that the delay period runs continuously from the entry of the first digit of the item-price number, uninterrupted by subsequent entries of digits, in which case it would be desirable to utilize a somewhat longer delay period. With either design, the delay logic 46 clears the item-price number from the item register 34, via line 59, and automatically resets after the running of the delay period.

The output of the total register 40 on data line 42 is continuously provided via branch data line 42b to the adder/subtracter 56 for automatic summation with the item-price number transferred to the ALU 56 following the delay period. The increased-total number arrived at by this process is then entered via data line 58 into the total register 40 in replacement of the existing total number, and such increased-total number is immediately shown on the total display 18 as previously described.

As noted above, upon transfer of the item-price number from the item register 34 to the ALU 54, the item-price number is first shifted into the multiplier 57 for purposes of applying tax to it if this function has been selected by the operator. In this regard, a data transfer demultiplexer 60 shifts an appropriate value over data line 62 into the multiplier 57.

In the embodiment shown, the multiplier 57 has a divide-by-10,000 input so that if no tax is to apply, it is necessary to multiply the item-price number by unity. To this end, a read-only-memory (ROM) 68 supplies the necessary value of 10,000 over data line 70 to the demultiplexer 60 for inputting to the multiplier 57 over data line 62. Conversely, if the operator selects application of tax to the item-price number, the demultiplexer 60 receives the appropriate value from a programmable continuous memory register 72 over data line 74 for inputting to the multiplier on data line 62. It will be appreciated that operation of the tax key 64 prior to the end of the delay period, and hence prior to the transfer of the item-price number into the multiplier 57, determines the source from which the demultiplexer 60 derives a value for inputting to the multiplier.

The capability of programming the applicable tax rate into the memory register 72 is provided as follows. The tax rate is entered, through operation of the appropriate input keys 14a-14j, as a percentage into the item register 34. The output of the item register 34 on data line 36 is provided over branch data line 36c as an input to the memory register 72. To store the tax in the memory register 72, a program tax switch 76, which is connected to the memory register on line 78, is activated during the delay period established by the delay logic 46. Activating the program tax switch 76, which is of the variety requiring deliberate insertion of a relatively sharp object such as the tip of a pen for activation, also operates on line 78 to clear the tax percentage from the item register 34.

In a further aspect of the invention, means are provided for correcting, during the delay period, item-price entries made in error. To this end, a correct key 80 is connected via a line 82 to a reset input of the delay logic 46. Operating the correct key 80 after one or more digits have been entered in the item register 34, but prior to the end of the delay period, serves to inhibit the delay logic 46 and prevents the transfer of the item-price number to the ALU 54. At the same time, the item-register is cleared via line 82 to permit a corrected entry to be made by the operator.

Additionally, means are provided, in the form of a subtract key 84 connected to the adder/subtracter 56 via a line 86, to enable the operator to subtract amounts out of the total register, as will be required when an item is returned to the shelves, or when an occasional erroneous entry of an item-price number has not been caught in time by operating the correct key 80. Operation of the subtract key 84 prior to the end of the delay period of the delay logic 46 conditions the adder/subtracter 56 to operate in a subtractive mode, such that the item-price when transferred into the ALU 54 will be subtracted from, instead of summed with, the existing total number stored in the total register 40. It will be appreciated, moreover, that operation of the tax key 64, in addition to the subtract key 84, prior to the end of the delay period, will cause a tax-adjusted item-price amount to be subtracted.

Finally, in FIG. 6, there is shown a suitable power and timing signal subsystem for the electronic calculating device of the present invention. This subsystem includes an on key 88 that, when depressed, resets a $2^{33}$ divider 90 over a line 92 on the low-to-high transition of key closure. On the high-to-low transition, corresponding to release of the on key 88, a flip-flop 94 is set, resulting in power being supplied from a power supply 96 (usually a battery) to all circuits and clearing both the item register 34 and the total register 40. The input to the divider 90 is supplied by the output of a 1 megahertz oscillator 97 over line 98, which also supplies a time base for clock synchronization of all data transfer and timing functions within the system illustrated in FIG. 5. The output of the divider 90 on line 99 is connected to the reset input of the flip-flop 94 to provide an automatic, power-saving shut-off of the device after about 2.4 hours. Operation of the on key 88 again simply acts to reset the divider 90, in effect to achieve a longer operating period, rather than turning the device off. In this manner, previous entries and operations stored in the device cannot be lost by inadvertent operation of the on key 88. To prevent inadvertent activation of the on key 88, it is surrounded by a partial barrier so that it is likely to be activated only by intentional action on the part of the operator.

It will be apparent from the foregoing that the present invention constitutes a significant improvement in the field of electronic calculating devices by meeting the needs of shoppers for a simplied and relatively foolproof device. It will also be apparent that, although a specific embodiment has been illustrated and described herein by way of example, various modifications may be made without departing from the spirit and scope of the invention set forth in the appended claims.

I claim:

1. An electronic calculating device, comprising:
   item storage means for storing an item-price number representing the price of an individual item;
   input means for entering said item-price number into said item storage means, said input means including a keyboard having manually-operable input keys for the digits 0 through 9, inclusive;
   total storage means for storing a total number representing a total of the prices of a plurality of items;
   display means for visually displaying said item-price number and said total number;
   accumulator means for receiving and adding together said item-price number and said total number to provide an increased-total number representing said total of the prices of said plurality of items increased by said price of said individual item, said accumulator means then entering said increased-total number into said total storage means in replacement of said total number; and
   data transfer means for transferring said item-price number from said item storage means to said accumulator means, said data transfer means including delay means for automatically triggering such transfer only after a predetermined delay period following entry of said item-price number into said item storage means.

2. An electronic calculating device as set forth in claim 1, wherein said display means includes an item display for visually displaying said item-price number and a total display for visually displaying said total number.

3. An electronic calculating device as set forth in claim 1, wherein said delay means is responsive to said input means.

4. An electronic calculating device as set forth in claim 3, wherein said input means enables said delay means in response to one of said input keys being operated.

5. An electronic calculating device as set forth in claim 3, wherein said input means resets and enables said delay means each time one of said input keys is operated.

6. An electronic calculating device as set forth in claim 1, wherein said input means further includes:
   correction means, including a manually-operable correct key, for selectively disabling said delay means, in response to operation of said correct key during said delay period, to inhibit the transfer of said item-price number from said item storage means to said accumulator means, said correction means being coupled to said item storage means such that the operation of said correct key during said delay period also clears said item-price number from said item storage means.

7. An electronic calculating device as set forth in claim 1, and further including:
   subtraction means, including a manually-operable subtract key, for selectively conditioning said accumulator means, in response to operation of said subtract key prior to the end of said delay period, to subtract said item-price number from said total number to provide a reduced-total number representing said total of the prices of said plurality of items reduced by said price of said individual item, said accumulator means then entering said reduced-total number into said total storage means in replacement of said total number.

8. An electronic calculating device as set forth in claim 1, and further including:
   tax means, connected intermediate said item storage means and said accumulator means, and including a manually-operable tax key, for selectively applying a prescribed tax rate to said item-price number, in response to operation of said tax key prior to the end of said delay period, to provide a tax-adjusted item-price number said accumulator means, said tax-adjusted item-price number representing the price of said individual item increased by an amount of applicable tax.

9. An electronic calculating device as set forth in claim 8, wherein said tax means includes means for selectively adjusting said tax rate.

10. An electronic calculating device, comprising:
    first means for storing and visually displaying an item-price number representing the price of an individual item;
    input means for entering said item-price number into said first means, said input means including a keyboard having manually-operable input keys for the digits 0 through 9, inclusive;
    second means for storing and visually displaying a total number representing a total of the prices of a plurality of items;
    accumulator means for receiving and adding together said item-price number and said total number to provide an increased-total number representing said total of the prices of said plurality of items increased by said price of said individual item, said accumulator means then entering said increased-total number into said second means in replacement of said total number;
    data transfer means for transferring said item-price number from said first means to said accumulator means, said data transfer means including delay means, responsive to said input means, for automatically triggering such transfer only after a predetermined delay period following entry of said item-price number into said first means, said delay means being coupled to said first means to then clear said item-price number from said first means; and
    correction means, including a manually-operable correct key, for selectively disabling said delay means, in response to operation of said correct key during said delay period, to inhibit the transfer of said item-price number from said first means of said accumulator means, said correction means being coupled to said first means such that the operation of said correction key during said delay period also clears said item-price number from said first means.

11. An electronic calculating device as set forth in claim 10, wherein said input means enables said delay means in response to one of said input keys being operated.

12. An electronic calculating device as set forth in claim 10, wherein said input means resets and enables said delay means each time one of said input keys is operated.

13. An electronic calculating device as set forth in claim 10, and further including:
    subtraction means, including a manually-operable subtract key, for selectively conditioning said accumulator means, in response to selective operation of said subtract key prior to the end of said delay period, to subtract said item-price number from said total number to provide a reduced-total number representing said total of the prices of said plurality of items reduced by said price of said individual item, said accumulator means then entering said reduced-total number into said second means in replacement of said total number.

14. An electronic calculating device as set forth in claim 10, and further including:
    tax means, connected intermediate said first means and said accumulator means, and including a manually-operable tax key, for selectively applying a prescribed tax rate to said item-price number, in response to operation of said tax key prior to the end of said delay period, to provide a tax-adjusted item-price number to said accumulator means, said tax-adjusted item-price number representing the price of said individual item increased by an amount of applicable tax.

15. An electronic calculating device as set forth in claim 14, wherein said tax means includes means for selectively adjusting said tax rate.

16. An electronic calculating device, comprising:
    first means for storing and visually displaying an item-price number representing the price of an individual item;
    input means for entering said item-price number into said first means, said input means including a keyboard having manually-operable input keys for the digits 0 through 9, inclusive;

second means for storing and visually displaying a total number representing a total of the prices of a plurality of items;

accumulator means, capable of an additive mode of operation and a subtractive mode of operation, for receiving said item-price number and said total number, said accumulator means normally operating in said additive mode of operation to add said item-price number to said total number to provide an increased-total number representing said total of the prices of said plurality of items increased by said price of said individual item, said accumulator means then entering said increased-total number into said second means in replacement of said total number;

data transfer means for transferring said item-price number from said first means to said accumulator means, said data transfer means including delay means for automatically triggering such transfer only after a predetermined delay period following entry of said item-price number into said first means, said delay means being coupled to said first means to then clear said item-price number from said first means;

subtraction means, including a manually-operable subtract key, for selectively conditioning said accumulator means, in response to operation of said subtract key prior to the end of said delay period, to operate in said subtractive mode of operation to subtract said item-price number from said total number to provide a reduced-total number representing said total of the prices of said plurality of items reduced by said price of said individual item, said accumulator means then entering said reduced-total number into said second means in replacement of said total number; and correction means, including a manually-operable correct key, for selectively disabling said delay means, in response to operation of said correct key during said delay period, to inhibit the transfer of said item-price number from said first means to said accumulator means, said correction means being coupled to said first means such that the operation of said correct key during said delay period also clears said item-price number from said first means.

17. An electronic calculating device as set forth in claim 16, wherein said delay means is responsive to said input means.

18. An electronic calculating device as set forth in claim 17, wherein said input means enables said delay means in response to one of said input keys being operated.

19. An electronic calculating device as set forth in claim 17, wherein said input means resets and enables said delay means each time one of said input keys is operated.

20. An electronic calculating device as set forth in claim 16, and further including:

tax means, including a manually-operable tax key, for selectively applying a prescribed tax rate to said item-price number, in response to operation of said tax key prior to the end of said delay period, to provide a tax-adjusted item-price number to said accumulator means, said tax-adjusted item-price number representing the price of said individual item increased by an amount of applicable tax.

21. An electronic calculating device as set forth in claim 20, wherein said tax means includes means for selectively adjusting said tax rate.

* * * * *